A. McL. NICOLSON.
THERMIONIC REPEATER.
APPLICATION FILED JAN. 13, 1917.
Reissued Dec. 17, 1918.
14,572.
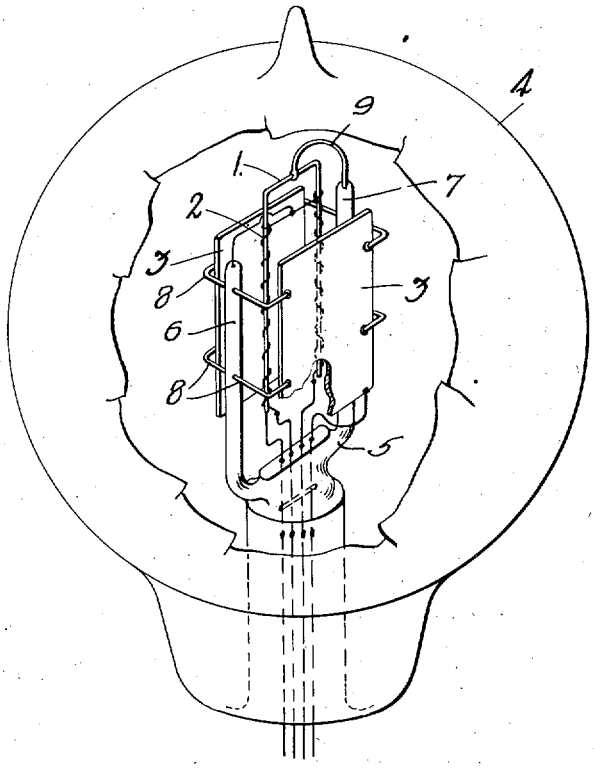
Inventor:
Alexander McLean Nicolson.
by A. C. Fanner, Att'y.

UNITED STATES PATENT OFFICE.

ALEXANDER McLEAN NICOLSON, OF NEW YORK, N. Y., ASSIGNOR, BY MESNE ASSIGNMENTS, TO AMERICAN TELEPHONE & TELEGRAPH COMPANY, A CORPORATION OF NEW YORK.

THERMIONIC REPEATER.

Specification of Reissued Letters Patent. Reissued Dec. 17, 1918.

14,572.

Original application filed September 23, 1914, Serial No. 863,209. Original patent a continuation of application Serial No. 843,502, filed June 6, 1914. Original No. 1,169,422, dated January 25, 1916. Application for reissue filed January 13, 1917. Serial No. 142,779.

*To all whom it may concern:*

Be it known that I, ALEXANDER McLEAN NICOLSON, a subject of the King of Great Britain, residing at New York, in the county of New York and State of New York, have invented certain new and useful Improvements in Thermionic Repeaters, of which the following is a full, clear, concise, and exact description.

This application is a continuation of an application by this applicant, Serial No. 843,502, filed June 6, 1914.

The invention relates to thermionic repeaters such as audions, and its object is to improve the efficiency thereof.

It has been found that the closer the input electrode and the cathode are brought together, the stronger the electric field and the more efficient the control of the thermionic current. This is true whether the repeater be one, say of the audion type, having a high-voltage output or one having a high-current output. The bringing of these two elements into as close relation to each other as possible without permitting them to contact electrically is brought about, in accordance with the present invention, by arranging them on opposite sides of, and preferably touching the opposing surfaces of a dielectric film. Furthermore, the interposed film is greatly beneficial in that it enables the amplifying efficiency of the audion to be increased by permitting the input electrode to be insulatively supported in exceedingly close relationship to the cathode. It has also been found that in the high-current output audion, it is desirable that the cathode present a large active area and that the input electrode present minimum obstruction between the cathode and the output electrode. These desirable features may best be obtained by entwining the two elements as by winding a filament directly about the input electrode. The input electrode preferably consists of one or more wires having an insulating coating, and the insulating coating preferably consists of a thin film of nickelous oxid, such coating having been found in practice to be a good dielectric for the purposes of this invention.

As shown in the drawing, projecting into the vacuum tube 4 is the usual press or squash 5 from which arise the arbors or supporting rods 6 and 7. From the arbor 6 extends a plurality of wires or connections 8 which are fastened to and support plate elements 3. From the other arbor extends a supporting connection 9 to the electrode 1.

The invention may be more readily understood by reference to the accompanying drawing showing in perspective a high-current output audion embodying the invention.

Referring to the drawing, the input electrode is shown in the form of two parallel wires 1, 1 electrically connected together, or in other words, as consisting of a single wire bent into U shape to provide the two forks 1, 1. The two forks or wires 1, 1 are coated with a suitable dielectric, such, for example, as nickelous oxid, which has been found to be very satisfactory and efficient for this purpose.

In the case of the high-current output audion illustrated in the drawing, the cathode is a heated filament 2 entwined about the two forks or wires 1, 1, thus presenting a large, active area. The output electrode is in the form of two plates 3, 3 parallel to each other and to the plane of the two wires 1, 1 and upon opposite sides thereof. The two plates 3, 3 are electrically connected together, and since the audion shown is of the high-current output type, said plates are placed near to the filament. The input electrode, the output electrode and the filament are inclosed as usual in an evacuated bulb 4, and the leading-in wires of the aforementioned elements of the audion are sealed in said bulb. By thermionic repeater is meant a repeater depending for its operation upon electron discharge from a heated cathode.

The invention is illustrated and claimed herein as applied to the audion which is believed to be the best type of thermionic repeater. In its broadest aspect, however, the invention is not limited to the particular structure herein illustrated but may be found useful in modified forms or types of thermionic repeaters.

What is claimed is:

1. An audion having input and output electrodes, and a helical filamentary cathode located between the other two electrodes.

2. An evacuated vessel containing three electrodes, one of which is a cathode forming a hollow cylinder and containing within it one of the other two electrodes, the third electrode being located outside the cylindrical cathode.

3. An evacuated vessel containing an input electrode, an output electrode, and a helical electrode adapted to serve as a source of electrons, said input electrode being surrounded by said helical electrode and said output electrode being located outside of said helical electrode.

4. A thermionic repeater having its input electrode and cathode entwined.

5. A thermionic repeater having its cathode wound upon its input electrode.

6. A thermionic repeater having its cathode entwined upon its input electrode.

7. A thermionic repeater having its input electrode in the form of a wire and having its cathode entwined about said wire.

8. A thermionic repeater having its input electrode in the form of a plurality of wires and having its cathode entwined about said wires.

9. A thermionic repeater having its input electrode in the form of a plurality of parallel wires and its cathode entwined about said wires.

10. A thermionic repeater having its input electrode coated with a dielectric and its cathode entwined upon said electrode.

11. A thermionic repeater having its input electrode coated with nickelous oxid and its cathode entwined upon said electrode.

12. A thermionic repeater having its input electrode coated with nickelous oxid and its cathode in contact with said coated electrode.

13. A thermionic repeater having its input electrode coated with an oxid and its cathode entwined upon said electrode.

14. A thermionic repeater having an input electrode and a cathode, one of said elements being coated with a dielectric and the other being entwined upon the former.

15. A thermionic repeater having an input electrode and a cathode, one of said elements being coated with an oxid and the other entwined upon the former.

16. A thermionic repeater having an input electrode and a cathode, one of said elements being coated with nickelous oxid and the other entwined upon the former.

17. A thermionic repeater having an input electrode and a cathode, one of said elements being coated with a dielectric and the other in contact with the coated element.

18. A thermionic repeater having an input electrode and a cathode, and an interposed separating film of non-conducting material in contact with both.

19. A thermionic repeater having an input electrode and a cathode, and an interposed film of insulating material carried by one of said elements and with which the other element contacts.

20. A thermionic repeater having an input electrode and a cathode arranged so close together as to permit the interposition of a thin film only, and a thin insulating film between said input electrode and said cathode.

21. A thermionic repeater having an input electrode and a cathode arranged in close proximity and held out of electrical contact with one another by an interposed dielectric.

22. A thermionic repeater having an input electrode and a cathode in immediate proximity to each other, and one supported by but held out of electrical contact with the other by an interposed dielectric.

23. A thermionic repeater having an input electrode and a cathode, and a covering of insulating material carried by one of said elements and with which the other element contacts.

24. A thermionic repeater having its cathode arranged between its input and output electrodes, and an interposed dielectric between said cathode and said input electrode.

25. A thermionic repeater comprising an input electrode, an output electrode and a cathode, said input electrode and said cathode being separated by an interposed dielectric film only, and said output electrode and said cathode being separated by vacuous space.

26. A thermionic repeater having its input electrode surrounded by its cathode and an anode outside of said cathode.

27. A thermionic repeater having a helical electrode in close proximity to and held out of electrical contact with another electrode by an interposed dielectric.

28. A thermionic device having a plurality of electrodes in immediate proximity to each other, and one supported by but held out of electrical contact with another electrode by an interposed dielectric.

29. A thermionic device comprising an electrode surrounded by a cathode and an anode outside of said cathode.

30. A space current device comprising a plurality of electrodes, one of which is insulatingly supported by another electrode.

31. In an evacuated vessel, an electrode, insulating material supported by said electrode and another electrode supported by said insulating material.

32. A vacuum tube device of the audion type comprising an output electrode, a cathode and a control electrode, one of said electrodes being insulatingly supported by another of said electrodes.

33. A vacuum tube device of the audion type comprising a pair of plate electrodes with a filamentary electrode and an auxiliary electrode located between the electrodes of said pair, said filamentary electrode being insulatingly supported by another of said electrodes.

34. A vacuum tube device of the audion type comprising a pair of plate electrodes with a filamentary electrode and an auxiliary electrode located between the electrodes of said pair, said filamentary electrode being insulatingly supported by said auxiliary electrode.

35. An evacuated vessel comprising an arbor, a pair of plate electrodes laterally disposed from said arbor and supported thereby, and an electrode between said plate electrodes.

36. An evacuated vessel comprising an arbor, a pair of plate electrodes laterally disposed from said arbor and supported thereby, and cathode and control electrodes located between the members of said pair.

37. An evacuated vessel comprising a pair of spaced parallel arbors, cathode, plate, and control electrodes, said electrodes being located between said arbors, and supported thereby.

38. A vacuum tube device comprising a press, a pair of spaced parallel rods arising from said press, and more than two electrodes including a cathode located between said rods and supported thereby.

39. A vacuum tube device comprising a press, a pair of spaced parallel arbors arising therefrom, a plurality of electrodes comprising a cathode, an input electrode and a plate electrode located between said arbors, and supporting arms connecting said arbors and said electrodes.

40. A vacuum tube device of the audion type comprising a plurality of electrodes, one of which is supported by another.

41. A vacuum tube device comprising an arbor, an electrode supported thereby, and another electrode supported by said first mentioned electrode.

42. A vacuum tube device comprising anode and control electrodes, and a filamentary cathode insulatingly supported by one of said electrodes.

43. A vacuum tube device comprising anode and control electrodes, and a filamentary cathode insulatingly supported by said control electrode.

44. A thermionic device comprising a helical filamentary cathode, anode surfaces at opposite sides of said cathode, and a control electrode between said anode surfaces and adjacent said cathode.

45. An evacuated vessel containing a cathode forming a hollow cylinder, an anode outside of said cylinder, and a control electrode adjacent said electrodes.

46. An evacuated vessel containing a press, a straight wire supported above said press, a helical electrode supported by said wire, and a coöperating anode.

47. An evacuated vessel containing a press, a straight wire supported above said press and parallel to the axis of said press, a helical electrode supported by said wire, and a coöperating anode.

48. An evacuated vessel containing a press, a straight wire supported above said press, a helical cathode supported by said wire, and an anode associated with said cathode.

49. An evacuated vessel containing a press, a straight wire supported above said press, a helical cathode surrounding said wire and supported thereby, and a coöperating anode.

50. A thermionic device comprising an evacuated vessel, a pair of parallel plate electrode surfaces, a plurality of parallel wires therebetween, and a helical electrode mounted on said wires.

51. An evacuated vessel comprising a press, a plurality of parallel wires supportingly connected to said press, a helical electrode mounted on said wires, anode surfaces at opposite sides of said electrode, and lead wires in said press for said electrodes.

In witness whereof, I hereunto subscribe my name this 4th day of January, 1917.

ALEXANDER McLEAN NICOLSON.